(12) United States Patent
Laaksonen et al.

(10) Patent No.: US 12,019,445 B2
(45) Date of Patent: Jun. 25, 2024

(54) STEERING OF FORKLIFT TRUCKS

(71) Applicant: Mitsubishi Logisnext Europe Oy, Järvenpää (FI)

(72) Inventors: Janne Laaksonen, Riihimäki (FI); Eero Puolatie, Järvenpää (FI)

(73) Assignee: Mitsubishi Logisnext Europe Oy, Järvenpää (FI)

( * ) Notice: Subject to any disclaimer, the term of this patent is extended or adjusted under 35 U.S.C. 154(b) by 662 days.

(21) Appl. No.: 17/268,534

(22) PCT Filed: Aug. 26, 2019

(86) PCT No.: PCT/FI2019/050597
§ 371 (c)(1),
(2) Date: Feb. 15, 2021

(87) PCT Pub. No.: WO2020/049213
PCT Pub. Date: Mar. 12, 2020

(65) Prior Publication Data
US 2021/0240188 A1 Aug. 5, 2021

(30) Foreign Application Priority Data
Sep. 3, 2018 (FI) ........................... 20185732

(51) Int. Cl.
*G05D 1/02* (2020.01)
*B66F 9/075* (2006.01)
*G05D 1/00* (2006.01)

(52) U.S. Cl.
CPC ......... *G05D 1/0212* (2013.01); *B66F 9/0755* (2013.01); *B66F 9/07568* (2013.01); *B66F 9/07572* (2013.01)

(58) Field of Classification Search
CPC .......... G05D 1/0212; G05D 2201/0216; B66F 9/0755; B66F 9/07568; B66F 9/07572
(Continued)

(56) References Cited

U.S. PATENT DOCUMENTS 6,032,757 A 3/2000 Kawaguchi et al.
10,087,603 B2 10/2018 Mitchell et al.
(Continued)

FOREIGN PATENT DOCUMENTS

CN 203228845 U 10/2013
CN 107867327 A 4/2018
(Continued)

OTHER PUBLICATIONS

Gi-hyoung et al., "Automatic Restarting Methods of Electric Forklifts in the Free Running State," 2013, Publisher: IEEE.*
(Continued)

*Primary Examiner* — Tuan C To
(74) *Attorney, Agent, or Firm* — MacMillan, Sobanski & Todd, LLC

(57) ABSTRACT

The invention relates to a method for controlling a motion of a counter balance forklift truck, the method comprises: detecting that a steering command generated with an endless rotating steering device corresponds to a reference steering point, in response to the detection providing at least two states for selecting a travel direction of the counter balance truck, detecting a selected state in accordance with a detection of a change in a steering command, and generating control signals individually to a plurality of electric drive motors for controlling the motion of the counter balance truck to meet the travel direction selected with the steering device. The invention also relates to a forklift truck implementing the method and to a computer program product.

11 Claims, 5 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2002/0148669 A1* | 10/2002 | Sugata | B66F 9/07568 180/411 |
| 2004/0011586 A1 | 1/2004 | Zhao | |
| 2004/0083025 A1* | 4/2004 | Yamanouchi | B66F 9/0755 700/213 |
| 2004/0149498 A1* | 8/2004 | Nakashima | B66F 9/07572 180/6.24 |
| 2008/0202858 A1 | 8/2008 | Borchers et al. | |
| 2009/0200097 A1 | 8/2009 | Farber et al. | |
| 2012/0109437 A1* | 5/2012 | Iwase | H01M 10/484 701/22 |
| 2014/0308097 A1* | 10/2014 | Akahori | B66F 9/07513 414/277 |
| 2015/0239492 A1* | 8/2015 | Yukitake | B62D 5/0484 701/43 |
| 2016/0082966 A1* | 3/2016 | Kaneko | B60W 30/18045 701/84 |
| 2016/0347248 A1* | 12/2016 | Manci | G01C 21/206 |
| 2017/0341915 A1* | 11/2017 | Kaneko | B62D 5/06 |
| 2018/0201316 A1* | 7/2018 | Mangette | G05B 13/021 |
| 2021/0276842 A1* | 9/2021 | Bistry | B66F 9/127 |

FOREIGN PATENT DOCUMENTS

| | | | | |
|---|---|---|---|---|
| EP | 1008508 | A2 | 6/2000 | |
| EP | 1304279 | A1 * | 4/2003 | ........... B60K 7/0007 |
| EP | 1431162 | A2 * | 6/2004 | ............. B62D 11/24 |
| EP | 3006289 | A1 * | 4/2016 | .............. B60K 6/365 |
| EP | 3006782 | A1 * | 4/2016 | ............. B60W 10/10 |
| EP | 3205619 | A1 * | 8/2017 | ................ B66F 9/06 |
| GB | 2534148 | A * | 7/2016 | .............. B66F 9/195 |
| WO | WO-2018132170 | A1 * | 7/2018 | ........... B62D 15/025 |

OTHER PUBLICATIONS

Zuxun et al., "Research on road feeling control strategy for electric forklift steer-by-wire system," 2016, Publisher: IEEE.*
Novellis, Leonardo De et al., Torque Vectoring for Electric Vehicles with Individually Controlled Motors: State-of-the-Art and Future Developments, World Electric Vehicle Journal, [online], May 6, 2012, vol. 5, 0617-0628, ISSN 2032-6653, [retrieved on Apr. 1, 2019]. Retrieved from <https://www.mdpi.com/2032-6653/5/2/617/pdf>. The whole document, especially section 3.1.
Chinese Office Action, Application No. 201980057294.2, dated Oct. 20, 2022.

* cited by examiner

STEERING OF FORKLIFT TRUCKS

PRIORITY

This application is a U.S. national application of the international application number PCT/FI2019/050597 filed on Aug. 26, 2019 and claiming priority of FI application number 20185732 filed on Sep. 3, 2018, the contents of all of which are incorporated herein by reference.

TECHNICAL FIELD

The invention concerns in general the technical field of forklift trucks. More particularly, the invention concerns a steering of a counter balance forklift truck.

BACKGROUND

Steering of vehicle, in general, is an important aspect for an operation of the vehicle in question. The steering of the vehicle is especially important in environments where there is a limited amount of space and a speed of operation plays an important role e.g. in a form of an efficiency. This kind of situation is with forklift trucks which typically operate in warehouses and warehouse areas.

Typically the steering of forklift trucks, and especially in so-called counter balance trucks, such as the one schematically illustrated in FIG. 1, is arranged so that there is one steered wheel 120 in a rear-side of the truck 100 and two driving wheels 110 in a front-side of the truck 100. The forks 130 are schematically illustrated in FIG. 1 in order to clarify the front and the rear sides of the truck 100. The non-limiting example of the counter balance truck 100 as illustrated in FIG. 1 comprises only one steered wheel 120, but another common implementation may comprise two steered wheels 120.

The steering operation in the counter balance trucks 100 according to prior art may be such that first truck's travel direction (forward/backward) is selected, or allowed to be selected, with a direction selector, such as with a lever, and by using a steering device, such as a steering wheel, the counter balance truck may be steered in a desired direction. However, the steering is arranged so that when the steered wheel reaches its maximum position, such as 90 degrees, or close to that, with respect to a direction of movement, a drive motor, being a dual drive motor, stops the inner driving wheel 110 and starts rotating it to opposite direction causing the truck to turn around until an operator changes travel direction with the direction selection. As a result the truck start traveling to another direction and the operator may again take steering actions for reaching a destination. The described operation requires manual actions from the operator as well as the truck fully stops at certain point of the steering operation. This makes the process slow. Additionally, the stopping of the truck causes stress to entities of the truck as well as to the load, but also an ergonomics of the operator is not optimal. Besides, the operator needs both hands in controlling of the truck when driven.

Hence, there is need to develop a steering of the truck to mitigate, at least in part, the above-mentioned drawbacks of the prior art solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention.

The following summary merely presents some concepts of the invention in a simplified form as a prelude to a more detailed description of exemplifying embodiments of the invention.

An objective of the invention is to present a method, a counter balance forklift truck and a computer program product for controlling a motion of the counter balance forklift truck. Another objective of the invention is that the method, the counter balance forklift truck and the computer program product provide a sophisticated steering solution of the truck The objectives of the invention are reached by a method, a counter balance forklift truck and a computer program product as defined by the respective independent claims.

According to a first aspect, a method for controlling a motion of a counter balance forklift truck is provided, the method comprises: detecting that a steering command generated with an endless rotating steering device corresponds to a reference steering point; in response to the detection providing, by a control unit, at least two states for selecting a travel direction of the counter balance forklift truck; detecting a selected state among the at least two states in accordance with a detection of a change in a steering command generated with the endless rotating steering device of the counter balance forklift truck; and generating control signals, by the control unit, individually to a plurality of electric drive motors of the counter balance forklift truck, each of the plurality of the electric drive motors configured to generate a driving force to at least one driving wheel, for controlling the motion of the counter balance forklift truck to meet the travel direction selected with the steering device.

A detection that the steering command generated by the endless rotating steering device corresponds to the reference steering point may be performed by comparing data included in the steering command to data defining the reference steering point. The data included in the steering command may comprise at least one of the following: data representing an absolute position of the steering device, data representing a steering motion of the steering device. For example, the data representing the absolute position of the steering device may be a turning angle of the steering device. On the other hand, the data representing the steering motion of the steering device may be a rotation direction and speed of the steering device.

Alternatively or in addition, the reference steering point may be determined to correspond to at least one of the following situation: a steered wheel in a single steered wheel truck implementation is detected to be steered transversely to the travel direction; a plurality of steered wheels in a plural steered wheel truck implementation is detected to be steered to a position matching with a circumference with respect to a centre of rotation of the counter balance forklift truck.

Moreover, in response to the detection that the travel direction is to be changed due to the selected state, the generation of the control signals individually to the plurality of the electric drive motors may be performed so that a sum of a speed of a plurality of driving wheels is maintained so that a travel speed of the counter balance forklift truck and a turning peripheral speed of the counter balance forklift truck are equal matching to a set speed for the counter balance forklift truck.

According to a second aspect, a counter balance forklift truck is provided, the counter balance forklift truck comprising: at least one control unit, an endless rotating steering device generating steering command to at least one steered wheel, a plurality of electric drive motors of the counter balance forklift truck, each of the plurality of the electric drive motors configured to generate a driving force to at least one driving wheel, the control unit is configured to: detect that a steering command generated with the endless rotating steering device corresponds to a reference steering point; provide, in response to the detection, at least two states for selecting a travel direction of the counter balance forklift truck; detect a selected state among the at least two states in accordance with a detection of a change in a steering command generated with the endless rotating steering device of the counter balance forklift truck; and generate control signals individually to the plurality of electric drive motors of the counter balance forklift truck for controlling the motion of the counter balance forklift truck to meet the travel direction selected with the steering device.

Further, the at least one steered wheel may be arranged to be endlessly rotating.

Still further, the counter balance forklift truck may further comprise at least one sensor configured to obtain measurement data representing a turning angle of the endless rotating steered wheel.

According to a third aspect, a computer program product for controlling a motion of a counter balance forklift truck is provided which, when executed by at least one processor of a control unit of the counter balance forklift truck, cause the control unit of the counter balance forklift truck to perform the method as described above.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 6A or 6B illustrates schematically an example of a driving situation of a counter balance forklift truck in which the present invention is implemented to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
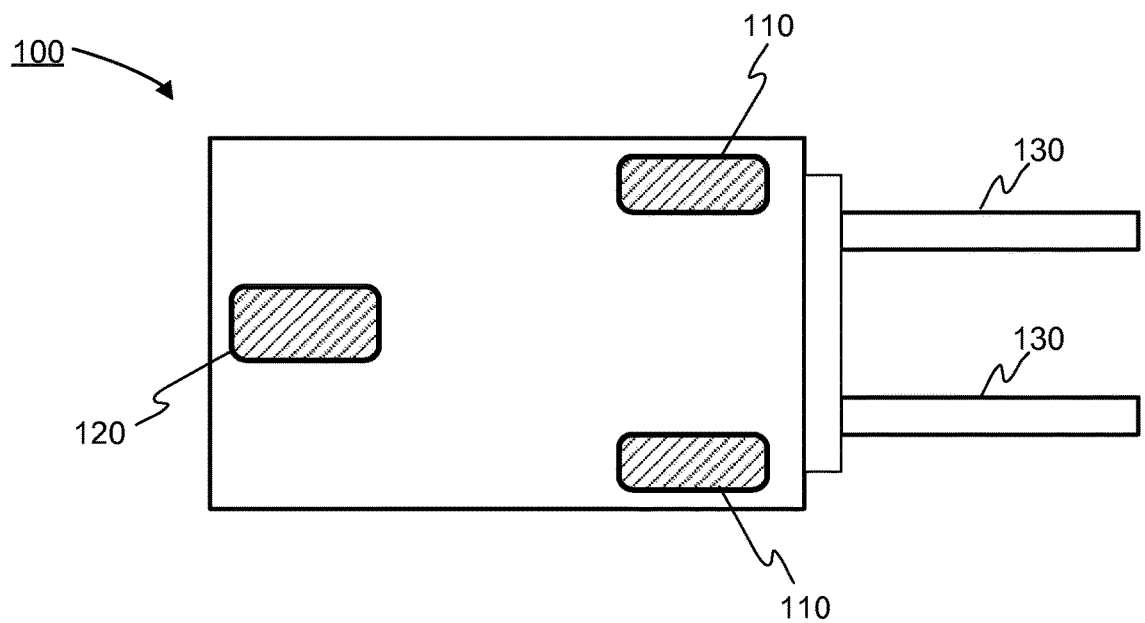
FIG. 1 illustrates schematically a counter balance forklift truck according to prior art.
Figure 2:
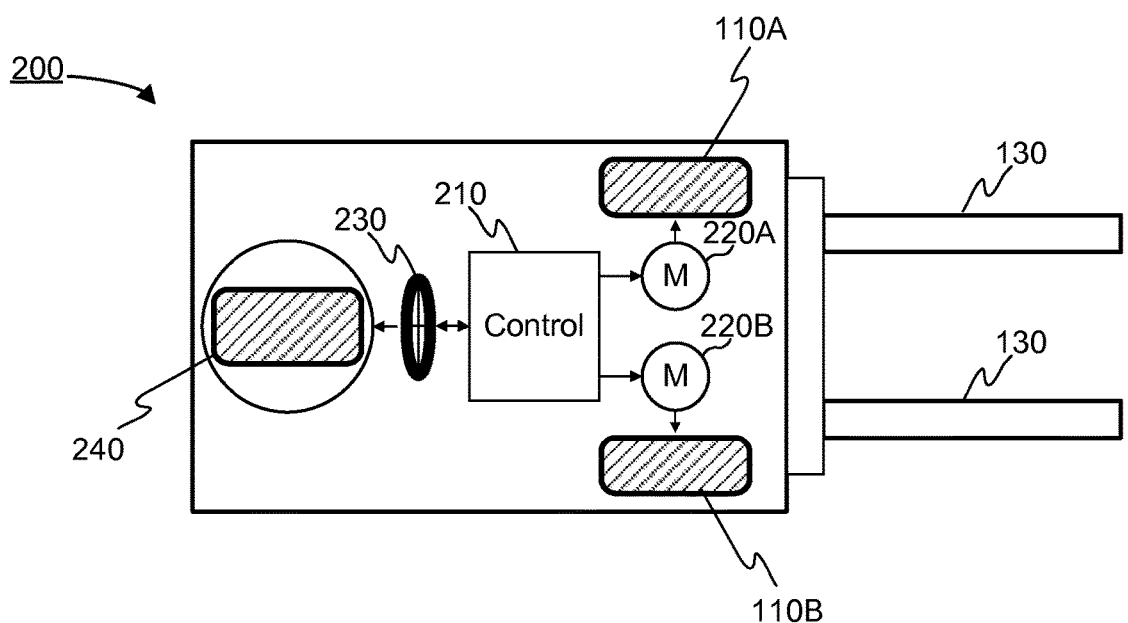
FIG. 2 illustrates schematically a counter balance forklift truck according to an embodiment of the invention.

FIG. 2 illustrates schematically a non-limiting example of a counter balance forklift truck 200 according to the present invention in which figure at least some elements and entities being relevant for describing the invention are schematically illustrated. The truck 200 may comprise a lifting mechanism, such as a fork tool 130, in a first side, i.e. here in a front-side, of the truck 200. The truck 200 comprises at least two driving wheels 110A, 110B, positioned e.g. in the first side, into which a driving force is individually generated by a dedicated electric drive motors 220A, 220B. In other words, the truck 200 according to an embodiment of the invention comprises at least two individually controllable electric drive motors 220A, 220B. Control signals for the drive motors may be generated by a control unit 210. Generally speaking the control unit 210 may be configured to obtain information representing at least some aspects of an operation of the truck 200 and to generate control functions for operating the truck 200. For example, the control unit 210 may be configured to obtain information relating to steering e.g. from a steering device 230, such as a steering wheel, but alternatively or in addition at least in some embodiment of the invention from at least one steered wheel 240. In other words, the steering device 230 may be configured to generate so called steering command e.g. in a continuous manner which indicates either an absolute position of the steering device 230 or a rotation direction and a speed of the steering device 230 which in turn may be interpreted e.g. by the control unit 210 to represent an instruction to the at least one steered wheel 240. According to the present invention the steered wheel 240 is arranged to be endlessly rotating which corresponds to that the steering device is also configured to rotate in the endless manner. This means that that the steered wheel 240 may rotate around its axis of rotation endlessly when steered. In other words, the steering of the truck 200 is arranged to rotate freely in accordance with a steering action. In practice, the above may be achieved, for example, by arranging a continuous absolute position sensor at the steering device 230 being a steering wheel, and by connecting this physical signal obtained from the sensor to the control unit 210. The steered wheel 240 shall have such a mechanical construction that there are no physical stop positions allowing a motor to rotate it continuously. The steered motor may also have a continuous absolute position sensor which is connected to the control unit 210 in order to give feedback on a reference steering command. The reference steering command refers to an actual steered wheel 240 position or rotation and speed target, which the control unit 210 targets to maintain close to the actual steered wheel angle. In the embodiment as disclosed in FIG. 2 the number of steered wheels 240 is one, but the invention is applicable in other implementations, such as when the truck 200 comprises at least two steered wheels 240, which may be positioned in a second side of the truck 200, i.e. in a rear-side. In the implementation where there is a plurality of the steered wheels 240 the operation of the steered wheels 240 may be arranged so that the rotation is substantially the same at least during a motion in order to achieve uniform steering. As mentioned above the steering of the at least one steered wheel 240 may be arranged with a steering device 230, such as with a steering wheel. A control of the steering device 230 by an operator of the truck 200 may be conveyed to the at least one steered wheel 240 mechanically or electrically. The control unit 210 may be configured to receive a steering command from the steering device 230. The steering command from the steering device 230 may be generated in response to a steering motion of the steering device 230 caused by the operator of the forklift truck 200. According to an embodiment the steering command is generated as a continuous process in accordance with the steering motion. The steering command may e.g. carry data indicating an absolute position or rotation direction and speed of the steering device 230. The absolute position may e.g. be monitored and, thus, represented as an angle measured with an applicable sensor, such as with an angle sensor, providing an applicable output. In this kind of embodiment a zero position shall be defined in order to express the absolute position with the rotation angle. In the embodiment in which the steering command carries data indicating the rotation direction and speed of steering device 230 in accordance with the steering motion the generation of the steering command may be based on a detection of incremental changes in one or more measured parameters, such as in the direction of rotation and the speed.

Figure 3:
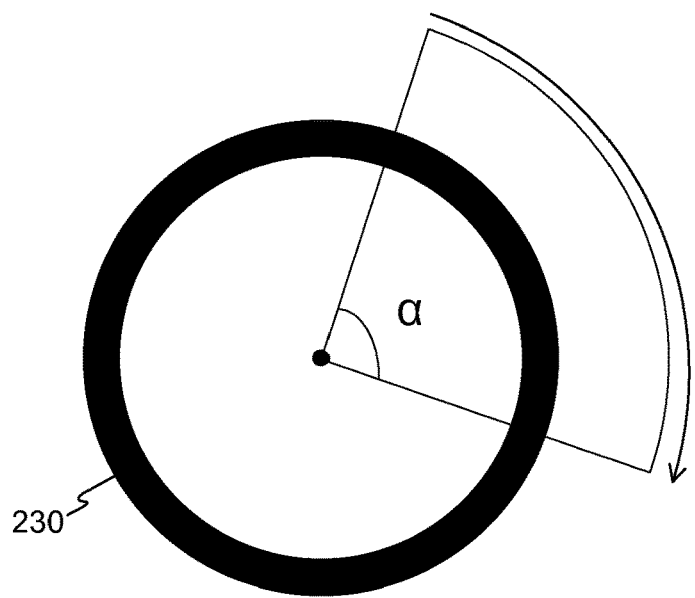
FIG. 3 illustrates schematically an example on a steering motion according to an embodiment of the invention.

FIG. 3 schematically illustrates an example on a steering motion on the basis of which the steering command may be generated in an embodiment in which the steering motion is expressed as an absolute position. The operator of the truck 200 may perform a steering motion, which is expressed as an angle α (alpha) in FIG. 3 i.e. indicating the turning angle of the steering device 230 during the steering motion. The steering motion causes a generation of a steering command by the steering device. The steering command generated to the control unit 210 may carry data expressing the motion as the turning angle of the steering device 230. Since the steering device 230 according to the present invention may be endlessly rotating, it means that if the steering motion is performed over the full round, the turning angle may be indicated accordingly by increasing the measure of the turning angle. On the other hand, if the steering device 230 is rotated in a counterclockwise, the turning angle may be expressed with a negative value, such as −α. In the described manner it is possible to provide information on a direction to which the motion, such as rotation, has occurred and a value representing the motion itself. Even if the steering device 230 in FIG. 3 is schematically illustrated as a steering wheel, the present invention is not only limited to such type of steering device 230, but any other may be applied to.

In the description above it is indicated that according to an embodiment the parameter representing the steering motion of the steering device 230 may be a turning angle of the steering device 230. As mentioned, according to another embodiment the steering motion may be expressed with data indicating a rotation direction and speed of the steering device, which may be detected with one or more applicable sensors, such as an incremental encoder or resolver.

Moreover, according to an embodiment of the invention a monitoring and detection arrangement may be implemented with respect to at least one steered wheel 240 in order to receive feedback information on a steering command. This is because a position of the at least one steered wheel 240 corresponds to a motion of a steering device 230 either directly or indirectly and it is advantageous to receive feedback information how the steering occurs. For sake of clarity, it shall be mentioned that the turning ratio between the steering device 230 and the at least one steered wheel is not necessarily 1:1, but it may be adjusted according to an implementation. In case the position of the at least one steered wheel 240 is monitored and detected it may be performed with one or more sensors positioned in a space, or spaces, in which the steered wheel 240, or the steered wheels 240, are rotatably arranged. The sensor may detect either directly or indirectly a position of the at least one steered wheel 240 with respect to a steering axis, or at least to generate measurement data from which the position is derivable e.g. by the control unit 210. Moreover, other parameters, such as rotation direction and speed may be monitored. By means of the monitored parameters it is possible to generate a reference steering command to be used as a feedback parameter in order to generate information on the steering, such as how the steering command and the reference steering command matches together.

Figure 4:
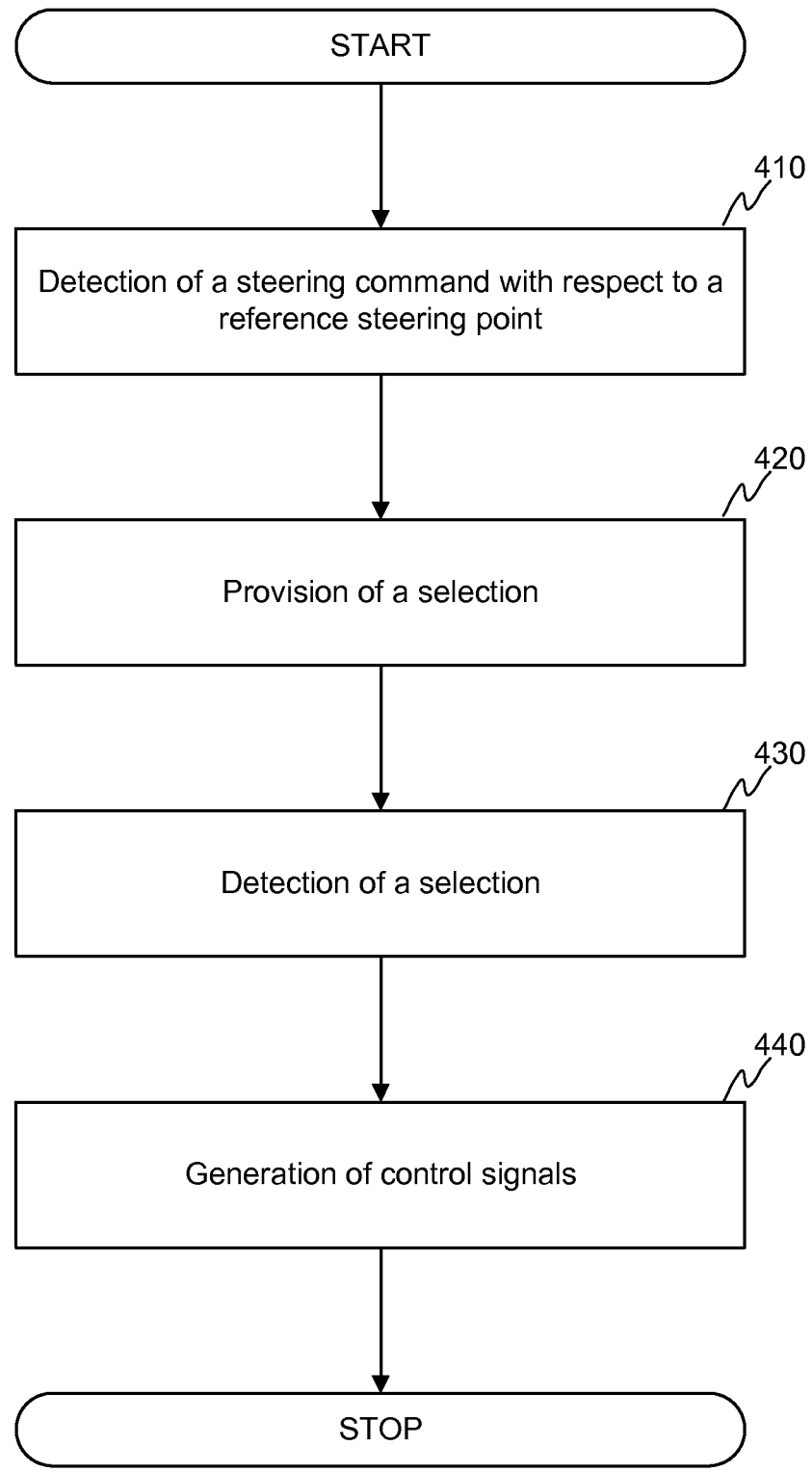
FIG. 4 illustrates schematically a method according to an embodiment of the invention.

Next at least some aspect relating to the present invention is described by referring to FIG. 4 schematically illustrating a method according to an embodiment of the invention. The method may be executed, at least in part, by a control unit 210 of the counter balance forklift truck 200 possibly by utilizing data from external entities, such as from one or more sensors, and by generating one or more signals to the external entities, such as to the electric drive motors 220A, 220B.

The method may provide a way to control a motion of a counter balance truck 200 in such a manner that in step 410 a steering command generated with an endless rotating steering device 230 it is detected. The steering command may comprise data representing a steering motion generated to the steering device 230, for example with the one or more parameters as described above. The control unit 210 may store, or may have access, to a data defining a reference steering point expressed e.g. with same type of data as the steering command from the steering device 230 is expressed. As said, the reference steering point may e.g. comprise a single value, or a plurality of values or one or more predetermined ranges. In other words, in step 410 a detection is made if the steering command generated with the steering device 230 corresponds to the reference steering point. In case the steering command of the steering device 230 does not reach the reference steering point the control unit 210 may e.g. be configured to maintain a motion of the forklift truck 200 as it is and to follow the steering accordingly. The reference steering point may define at least one point, or at least one state of steering, in which at least two states, such as travel directions, are available for selection as will be discussed.

Figure 5:
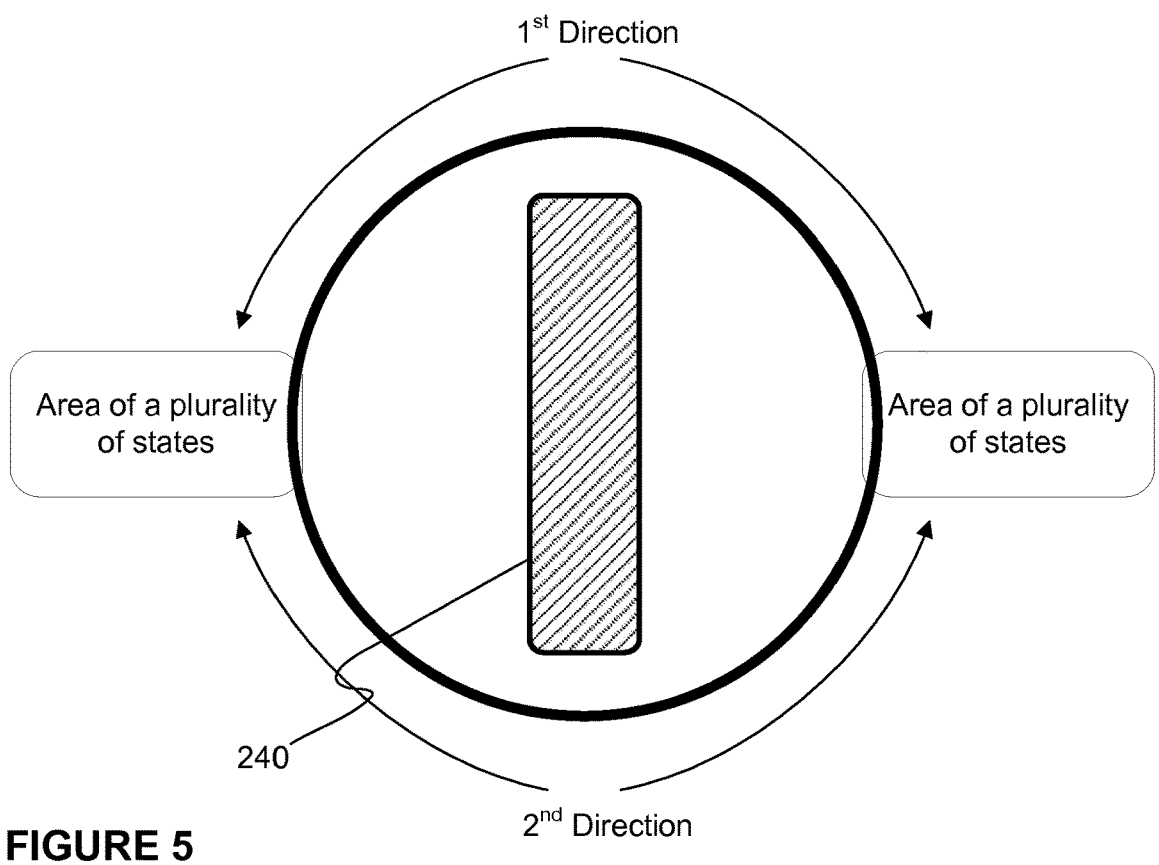
FIG. 5 illustrates schematically some aspects of a solution according to an embodiment of the invention in the form of a state diagram.

On the other hand, if the control unit 210 detects, through the comparison, that the steering command generated with the steering device 230 corresponds to the reference steering point, it may be configured to provide a plurality of states for selecting 420 a travel direction of the counter balance truck 200. In other words, the control unit 210 may be configured to enable at least two states for selecting the travel direction in response to a generation of the steering command of the steering wheel 230. The provision of the plurality of states for a selection is disclosed as a non-limiting example in FIG. 5 in which a simplified state diagram is depicted. The circle may be considered as a space in which the steered wheel 240 may rotate. Now, in the non-limiting example of FIG. 5 there is defined two areas, i.e. reference steering points, in which, when the steering command corresponds to one of the reference steering point (i.e. the steering command has caused the steered wheel 240 to such a position that it meets one of the areas), the control unit 210 may provide at least two states between which a travel direction of the truck 200 may be selected. These at least two states may be referred as a first direction, such as a forward direction, and a second direction, such as a backward direction. The arrows in FIG. 5 are illustrated for providing an understanding if the truck 200 initially travels to a first direction, or a second direction, and the steering enters one of the areas, i.e. to the reference steering point, in which the plurality of states may be provided. Hence, the operator of the truck 200 may select between the two states with the steering device, but only when the reference steering point is reached with the steering command.

As a non-limiting example of above the reference steering points defined for the steering command generated with the steering device 230 may correspond to a situation in which a steered wheel 240 in a single steered wheel implementation is steered to a predetermined position with respect to a travel direction, such as transversely to the travel direction. Alternatively, a plurality of steered wheels 240 in a plural steered wheel truck implementation may be detected to be steered to a position matching with a circumference with respect to a centre of rotation of the truck 200. The centre of rotation may refer to a middle point of an axis of the driving wheels 110A, 110B. The above given examples of the definitions to the reference steering points are non-limiting examples. For example, it may be arranged that the reference steering points are different in accordance with a travel direction of the forklift truck 200.

Next, the control unit 210 may be configured to monitor an action of the operator indicated with the steering device 210 and in that manner to detect 430 a selected state among a plurality of states in accordance with a detection of a change in a steering command generated with the steering device 210 of the counter balance truck 200. The detection of the change may comprise, but is not limited to, a detection that the steering command representing the selection state is changed due to steering motion and the direction of the steering motion defines the travel direction of the truck 200 desired by the operator.

Furthermore, the control unit 210 may be configured to generate control signals 440 to a plurality of electric drive motors 220A, 220B configured to generate the driving force to the driving wheels 110A, 110B. In other words, in response to the detection of the selection the control unit 210 may be configured generate, individually for each electric drive motor 220A, 220B a control signal for controlling the motion of the counter balance truck 200 to meet the travel direction selected with the steering device 230. As a non-limiting example, the generation of the control signals individually to the plurality of the electric drive motors 220A, 220B may e.g. be performed so that a sum of a speed of a plurality of driving wheels 110A, 110B may be maintained so that a travel speed of the truck 200 and a turning peripheral speed of the truck 200 are equal matching to a set speed for the truck 200. In this manner a pleasant change in travel direction may be experienced by the operator of the truck 200. Here, the travel speed of the truck 200 refers to actual speed the truck has at the instant of time. The turning peripheral speed, in turn, refers to peripheral speed when the truck is turning (i.e. changing its travel direction). The turning peripheral speed may be controlled e.g. to stay constant by controlling each drive motors individually. Having the constant turning peripheral speed is advantageous in a sense that it is pleasant for the operator, but also a control of the load is also improved. Finally, the set speed of the truck refers to a desired speed of the truck controlled with power adjusting device, such as with gas pedal.

Figure 6A:
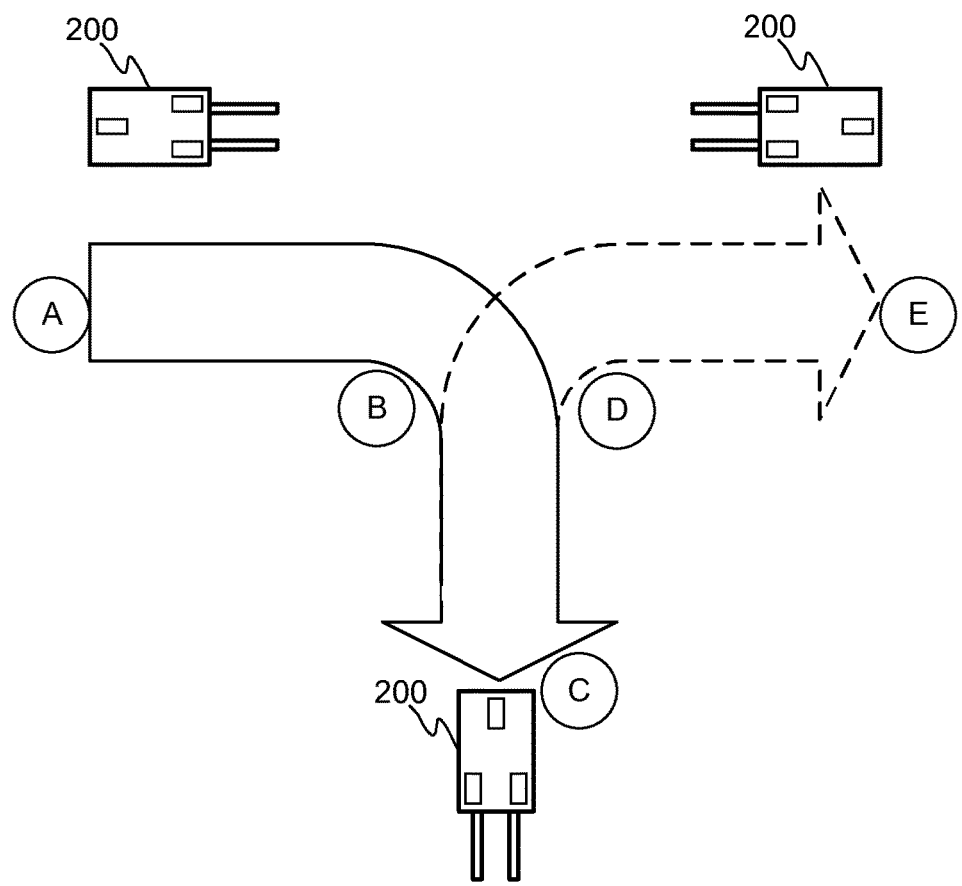
Figure 6B:
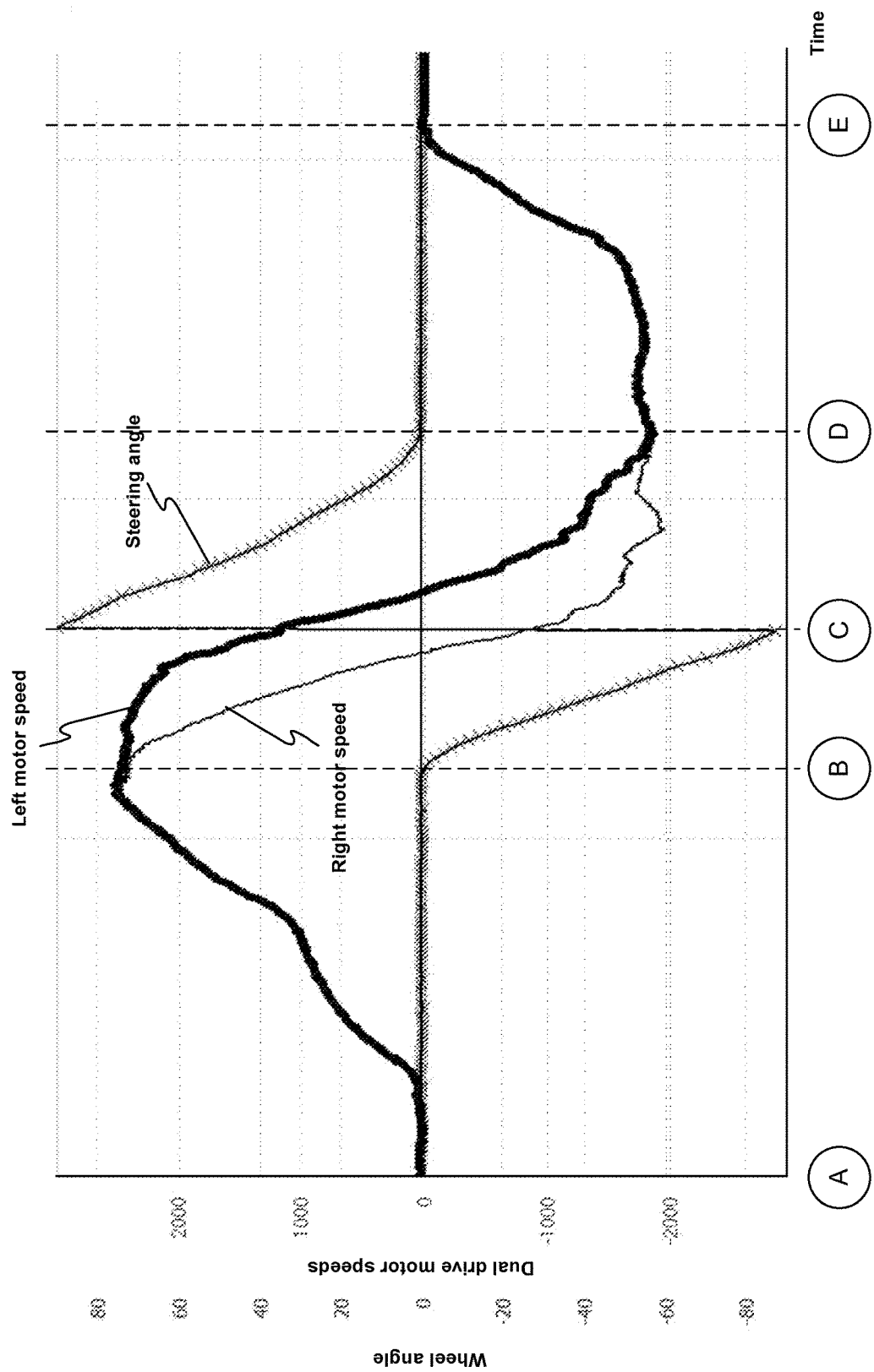

FIGS. 6A and 6B illustrate schematically an operation of the present invention according to an embodiment of the invention as a signal diagram. More specifically, FIG. 6A illustrates an example of steering operation in which a truck is first driving to a first direction (forward direction) and it is turned around resulting to drive to a second direction (backward direction). In FIGS. 6A and 6B corresponding states are marked with A, B, C, D and E. In the state A the forklift truck 200 stands still having the wheel angle at zero point (i.e. directing forward i.e. parallel to driving wheels). The operator of the truck 200 performs an action which causes the truck 200 to accelerate into forward direction. In FIG. 6B the acceleration may be seen as rising curves of the right and left motor speeds. In the state B the operator of the truck 200 starts a steering motion causing the steering wheel angle to change and the truck turns right (see the route in FIG. 6A). The speeds of the left and right motors are controlled accordingly (i.e. their speeds are different to each other). At some point (state C) the steering is at a position that the position of the steered wheel in this non-limiting example reaches 90 degrees (i.e. the steered wheel is transversely to the travel direction), which is detected by the control unit 210 and it provides the two states for selecting a travel direction of the truck 200. In the example as illustrated in FIGS. 6A and 6B the operator controls a continuous rotation of the steering device 230 and performs in that manner a selection with the steering device 230 indicating that the truck 200 shall initiate backward direction (state C). In that state the steering angle changes stepwise from −90 degrees to +90 degrees. The steering of the truck 200 from the state B onwards is achieved by adjusting the rotating speeds of the right and left motors 220A, 220B together with the at least one steered wheel 240 so that prior to the situation that the steering angle reaches the transfer point (state C), a rotation of an inner driving wheel 110A, 110B is halted with the corresponding drive motor 220A, 220B (i.e. the right driving wheel in the case of FIGS. 6A and 6B) and causing it immediately to rotate to opposite direction. Similarly, the rotation of the outer driving wheel 110A, 110B is adjusted by controlling the corresponding drive motor 220A, 220B (i.e. the left driving wheel in the case of FIGS. 6A and 6B) so that it is halted after the state C and its rotation is also caused to rotate to the opposite direction. For sake of clarity it is worthwhile to understand that the truck 200 starts traveling to backward direction already when a sum of the speeds of the drive motors 220A, 220B is negative (i.e. immediately after the state C and prior to the situation that the rotation of the outer driving wheel 110A, 110B is halted). Finally, the drive motors 220A, 220B generate a force causing both driving wheels 110A, 110B to rotate again to the same direction. The continuous rotation of the steering device 230 (also between states C and D) causes the truck 200 to reach a point in which the truck 200 heads directly backward direction i.e. the steering angle is controlled so that the steered wheel is again parallel to the driving wheels. Finally, the motion of the truck is stopped at the state E. The description above relating to the FIGS. 6A and 6B is a non-limiting example and it aims to increase understanding on a controlling of the electric drive motors 220A, 220B in response to steering motion, and especially on the selection of the driving direction with the steering device 230. In other words, the steering motion of the steering device 230 allows a control of the drive motors 220A, 220B and in that manner to change a travel direction of the truck 200 through a selection of a state with the steering device 230. Thus, the operation as is schematically illustrated in FIGS. 6A and 6B corresponds to a solution in which a steering command generated with the endless rotating steering device 230 corresponds to a reference steering point (i.e. the state C in FIG. 6B) in which a selection of states is provided.

Figure 7:
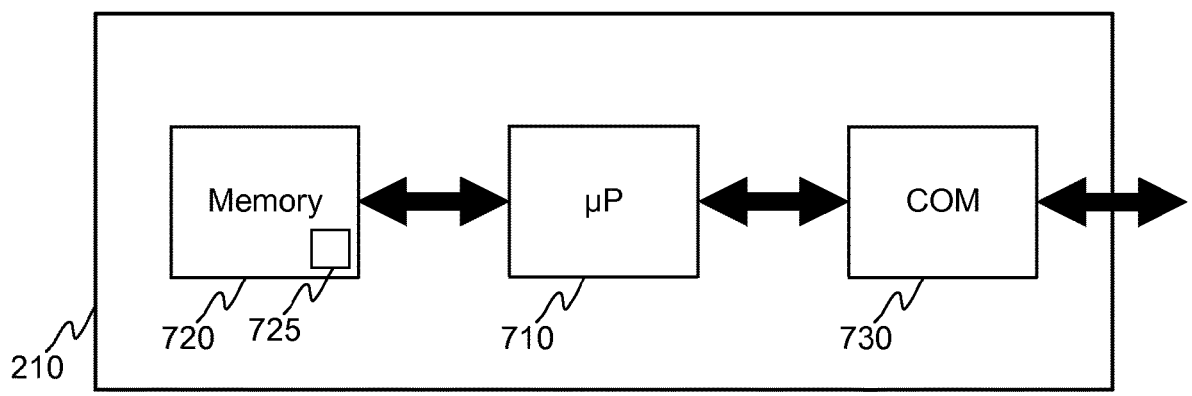
FIG. 7 illustrates schematically a control unit according to an embodiment of the invention.

FIG. 7 schematically illustrates an example of a control unit 210 of a counter balance forklift truck 200 which may be configured to communicate with a plurality of entities of the truck 200 either directly or indirectly. In some embodiment of the invention the control unit 210 may be configured to communicate with external entities, such as with a data center. The control unit 210, when implemented as a single control unit, may comprise a processing unit 710 comprising one or more processors, a memory unit 720 comprising one or more memory devices and a communication interface 730 comprising one or more communication devices, such as one or more modems, one or more data buses and/or one or more other devices. Advantageously, the memory unit 720 may store portions of computer program code 725 and any other data, and the processing unit 710 may cause the control unit 210 to operate as described by executing at least some portions of the computer program code stored in the memory unit 720. The physical implementation of the control unit 210 may be centralized or distributed, wherein the distributed implementation may refer to a solution wherein at least some of the entities belonging to the forklift truck 200 as described may comprise a dedicated processing unit and wherein the control unit 210 may comprise one processing unit configured to operate as a master unit. For example, in a distributed control unit environment in a forklift truck there may be a steering control unit, master control unit and a driving control unit operating in chain and communication with each other, and with other entities, for achieving a desired effect. In such an embodiment the steering control unit may generate the steering command to the master control unit for the further functionalities according to the invention. For sake of clarity, in the implementation as depicted in FIG. 2 the control unit 210 may receive the sensor data expressing the steering command directly or indirectly for processing it according to the method of the invention.

At least some aspects of the present invention may relate to a processor-readable non-transitory storage medium on which is stored one or more sets of processor executable instructions, e.g. in a form of portions of computer program code 725, configured to implement one or more of steps of the method as described. The instructions may also reside, completely or in part, within a main memory, the static memory, and/or within the processor during execution thereof by the at terminal device in question. The term computer-readable medium shall also cover, but is not limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other information archive or set of archives considered to be a distribution medium equivalent to a tangible storage medium.

The solution according to the present invention mitigates the drawbacks of the prior art solutions by enabling an improved steering to the operator of a counter balance forklift truck 200. The invention is, at least in part, based on an improved control in which a state of the truck is monitored by analyzing steering motion of the truck 200 and if at least one predetermined condition is fulfilled, a selection of a driving direction is provided to the operator to be done with the steering device 230. The present invention improves a control of the truck 200 in that manual actions required from the operator of the truck may be reduces when controlling the driving. This, among other things, makes the driving operation faster compared to prior art solutions. Additionally, the continuous motion of the truck achieved with the present invention mitigates the stress to entities of the truck as well as to the load, and improves an ergonomics of the operator, because the motion is continuous.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for controlling a motion of a counter balance forklift truck, the method comprises:
   detecting that a steering command generated with an endless rotating steering device corresponds to a reference steering point,
   in response to the detection providing, by a control unit, at least two states for selecting a travel direction of the counter balance forklift truck between forward direction and backward direction,
   detecting a selected state among the at least two states in accordance with a detection of a change in a steering command generated with the endless rotating steering device of the counter balance forklift truck, and
   generating control signals, by the control unit, individually to a plurality of electric drive motors of the counter balance forklift truck,
   each of the plurality of the electric drive motors configured to generate a driving force to at least one driving wheel, for controlling the motion of the counter balance forklift truck to meet the travel direction selected with the endless rotating steering device.

2. The method of claim 1, wherein a detection that the steering command generated by the endless rotating steering device corresponds to the reference steering point is performed by comparing data included in the steering command to data defining the reference steering point.

3. The method of claim 2, wherein the data included in the steering command comprises at least one of the following: data representing an absolute position of the steering device, data representing a steering motion of the steering device.

4. The method of claim 3, wherein the data representing the absolute position of the steering device is a turning angle of the steering device.

5. The method of claim 3, wherein the data representing the steering motion of the steering device is a rotation direction and speed of the steering device.

6. The method of claim 1, wherein the reference steering point is determined to correspond to at least one of the following situation:
   a steered wheel in a single steered wheel truck implementation is detected to be steered transversely to the travel direction;
   a plurality of steered wheels in a plural steered wheel truck implementation is detected to be steered to a position matching with a circumference with respect to a centre of rotation of the counter balance forklift truck.

7. The method of claim 1, wherein in response to the detection that the travel direction is to be changed due to the selected state, the generation of the control signals individually to the plurality of the electric drive motors is performed so that a sum of a speed of a plurality of driving wheels is maintained so that a travel speed of the counter balance forklift truck and a turning peripheral speed of the counter balance forklift truck are equal matching to a set speed for the counter balance forklift truck.

8. A counter balance forklift truck, the counter balance forklift truck comprising:
　at least one control unit,
　an endless rotating steering device generating steering command to at least one steered wheel,
　a plurality of electric drive motors of the counter balance forklift truck, each of the plurality of the electric drive motors configured to generate a driving force to at least one driving wheel,
　the control unit is configured to:
　detect that a steering command generated with the endless rotating steering device corresponds to a reference steering point,
　provide, in response to the detection, at least two states for selecting a travel direction of the counter balance forklift truck between forward direction and backward direction,
　detect a selected state among the at least two states in accordance with a detection of a change in a steering command generated with the endless rotating steering device of the counter balance forklift truck, and
　generate control signals individually to the plurality of electric drive motors of the counter balance forklift truck for controlling the motion of the counter balance forklift truck to meet the travel direction selected with the endless rotating steering device.

9. The counter balance forklift truck of claim 8, wherein the at least one steered wheel is arranged to be endlessly rotating.

10. The counter balance forklift truck of claim 8, the counter balance forklift truck further comprising at least one sensor configured to obtain measurement data representing a turning angle of the endless rotating steered wheel.

11. A computer program product for controlling a motion of a counter balance forklift truck which, when executed by at least one processor of a control unit of the counter balance forklift truck, cause the control unit of the counter balance forklift truck to perform:
　detecting that a steering command generated with an endless rotating steering device corresponds to a reference steering point,
　in response to the detection providing, by a control unit, at least two states for selecting a travel direction of the counter balance forklift truck between forward direction and backward direction,
　detecting a selected state among the at least two states in accordance with a detection of a change in a steering command generated with the endless rotating steering device of the counter balance forklift truck, and
　generating control signals, by the control unit, individually to a plurality of electric drive motors of the counter balance forklift truck, each of the plurality of the electric drive motors configured to generate a driving force to at least one driving wheel, for controlling the motion of the counter balance forklift truck to meet the travel direction selected with the endless rotating steering device.

* * * * *